United States Patent
Florencio et al.

(10) Patent No.: US 9,956,687 B2
(45) Date of Patent: May 1, 2018

(54) ADAPTING ROBOT BEHAVIOR BASED UPON HUMAN-ROBOT INTERACTION

(71) Applicant: Microsoft Corporation, Redmond, WA (US)

(72) Inventors: Dinei A. Florencio, Redmond, WA (US); Douglas Guimarães Macharet, Belohorizonte (BR); Dan Bohus, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days. days.

(21) Appl. No.: 13/783,405

(22) Filed: Mar. 4, 2013

(65) Prior Publication Data
US 2014/0249676 A1  Sep. 4, 2014

(51) Int. Cl.
*G06F 19/00* (2011.01)
*B25J 9/16* (2006.01)
*G06N 3/00* (2006.01)

(52) U.S. Cl.
CPC ............ *B25J 9/1694* (2013.01); *G06N 3/008* (2013.01); *Y10S 901/01* (2013.01); *Y10S 901/47* (2013.01)

(58) Field of Classification Search
CPC ...... B25J 9/1694; G06N 3/008; Y10S 901/01; Y10S 901/47
USPC ........ 700/259, 245, 264; 901/47, 30, 31, 32, 901/33, 34, 35; 382/155; 318/568.1, 318/368.11; 706/12
See application file for complete search history.

(56) References Cited

U.S. PATENT DOCUMENTS

| | | | |
|---|---|---|---|
| 6,122,572 A * | 9/2000 | Yavnai | 701/23 |
| 6,175,772 B1 | 1/2001 | Kamiya et al. | |
| 7,957,837 B2 | 6/2011 | Ziegler et al. | |
| 2007/0063850 A1 * | 3/2007 | Devaul et al. | 340/573.1 |

(Continued)

FOREIGN PATENT DOCUMENTS

| | | |
|---|---|---|
| CN | 1835828 A | 9/2006 |
| CN | 101020312 A | 8/2007 |
| CN | 102592046 A | 7/2012 |

OTHER PUBLICATIONS

Mason, et al., "Robot Self-Initiative and Personalization by Learning through Repeated Interactions",Retrieved at https://flowers.inria.fr/mlopes/myrefs/11-hri.pdf>>, 6th ACM/IEEE International Conference on Human-Robot Interaction, Mar. 8, 2011, pp. 1-8.

(Continued)

*Primary Examiner* — Ronnie Mancho
(74) *Attorney, Agent, or Firm* — Medley, Behrens & Lewis, LLC (57) ABSTRACT

Technologies pertaining to human-robot interaction are described herein. The robot includes a computer-readable memory that comprises a model that, with respect to successful completions of a task, is fit to observed data, where at least some of such observed data pertains to a condition that is controllable by the robot, such as position of the robot or distance between the robot and a human. A task that is desirably performed by the robot is to cause the human to engage with the robot. The model is updated while the robot is online, such that behavior of the robot adapts over time to increase the likelihood that the robot will successfully complete the task.

20 Claims, 6 Drawing Sheets

(56) References Cited

U.S. PATENT DOCUMENTS

| | | | |
|---|---|---|---|
| 2011/0257949 A1* | 10/2011 | Vasudevan | G06F 17/18 703/2 |
| 2011/0288667 A1* | 11/2011 | Noda et al. | 700/98 |
| 2012/0116584 A1 | 5/2012 | Kim et al. | |
| 2012/0284080 A1 | 11/2012 | De Oliveira et al. | |
| 2013/0151442 A1* | 6/2013 | Suh | G06N 3/008 706/12 |
| 2013/0345870 A1* | 12/2013 | Buehler et al. | 700/257 |
| 2013/0346348 A1* | 12/2013 | Buehler et al. | 706/12 |
| 2014/0163640 A1* | 6/2014 | Edgerton | A61N 1/0551 607/48 |
| 2014/0241617 A1* | 8/2014 | Shotton | G06K 9/00671 382/159 |

OTHER PUBLICATIONS

Shon, et al., "Robotic Imitation from Human Motion Capture using Gaussian Processes", Retrieved at <<http://neural.cs.washington.edu/files/humanoids.pdf>>, 5th IEEE-RAS International Conference on Humanoid Robots, Dec. 5, 2005, pp. 1-6.

Svenstrup, et al., "Adaptive Human-Aware Robot Navigation in Close Proximity to Humans ", Retrieved at <<http://cdn.intechweb.org/pdfs/15957.pdf>>, International Journal of Advanced Robotic Systems, vol. 8, No. 2, 2011, pp. 1-15.

Deshmukh, et al., "Ubiquitous Social Perception Abilities for Interaction Initiation in Human-Robot Interaction", Retrieved at http://www.macs.hw.ac.uk/~myl/Papers/AFFINE10.pdf>>, 3rd International Workshop on Affective Interaction in Natural Environments, Oct. 29, 2010, pp. 1-6.

Fasola, et al., "Using Socially Assistive Human-Robot Interaction to Motivate Physical Exercise for Older Adults", Retrieved at <<http://cres.usc.edu/pubdb_html/files_upload/763.pdf>>, IEEE Journal, vol. 100, Issue 8, Jul. 2012, pp. 1-15.

Sidner, et al., "Explorations in Engagement for Humans and Robots", Retrieved at <<http://arxiv.org/pdf/cs/0507056v1.pdf>>, In Journal of Artificial Intelligence, vol. 166, Issue 1-2, Aug. 2005, pp. 1-31.

Rich, et al., "Recognizing Engagement in Human-Robot Interaction", Retrieved at <<http://mysite.verizon.net/sidner/RichEtA12010_HRI.pdf>>, In Proceedings of the 5th ACM/IEEE International Conference on Human-Robot Interaction, Mar. 2, 2010, pp. 1-8.

Bohus, et al., "Learning to Predict Engagement with a Spoken Dialog System in Open-World Settings", Retrieved at <<http://www.sigdial.org/workshops/workshop10/proc/pdf/SIGDIAL35.pdf>>, In Proceedings of the SIGDIAL, Sep. 2009, pp. 1-9.

Bergstrom, et al., "Modeling of Natural Human-Robot Encounters", Retrieved at <<http://ieeexplore.ieee.org/stamp/stamp.jsp?tp=&arnumber=4650896>>, in IEEE/RSJ International Conference on Intelligent Robots and Systems, Sep. 22, 2008, pp. 1-7.

Shi, et al., "Spatial Formation Model for Initiating Conversation", Retrieved at <<http://www.roboticsproceedings.org/rss07/p39.pdf>>, In Proceedings of Robotics: Science and Systems, Jun. 2011, pp. 1-8.

Satake, et al., "How to Approach Humans?: Strategies for Social Robots to Initiate Interaction", Retrieved at <<http://www.irc.atr.jp/~dylan/pdf/satake-hri2009.pdf>>, in Proceedings of the 4th ACM/IEEE International Conference on Human Robot Interaction, Mar. 11, 2009, pp. 1-8.

Kanda, et al., "Abstracting Peoples Trajectories for Social Robots to Proactively Approach Customers", Retrieved at <<http://ieeexplore.ieee.org/stamp/stamp.jsp?tp=&arnumber=5306137>>, In IEEE Transactions on Robotics, vol. 25, Issue 6, Dec. 2009, pp. 1-15.

Walters, et al., "An Empirical Framework for Human-Robot Proxemics", Retrieved at <<http://citeseerx.ist.psu.edu/viewdoc/download?doi=10.1.1.160.202&rep=rep1&type=pdf>>, In Proceedings of the Symposium on New Frontiers in Human-Robot Interaction Symposium at the AISB Convention, Apr. 8, 2009, pp. 1-6.

Mumm, et al., "Human-Robot Proxemics: Physical and Psychological Distancing in Human-Robot Interaction", Retrieved at <<http://pages.cs.wisc.edu/~bilge/pubs/MM11.pdf>>, In Proceedings of the 6th International Conference on Human-Robot Interaction, Mar. 6, 2011, pp. 1-8.

Walters, et al., "A Long-Term Human-Robot Proxemic Study", In In Proceedings of the IEEE International Symposium on Robot and Human Interactive Communication, Aug. 2011, pp. 1-6.

Svenstrup, et al., "Pose Estimation and Adaptive Robot Behaviour for Human-Robot Interaction", Retrieved at <<http://vbn.aau.dk/files/36563049/Adaptive-Pose-Estimation.pdf>>, In Proceedings of the IEEE International Conference on Robotics and Automation, May 12, 2009, pp. 1-6.

Kessler, et al., "Approaching a Person in a Socially Acceptable Manner Using a Fast Marching Planner", Retrieved at <<http://www.tu-ilmenau.de/fileadmin/media/neurob/publications/conferences_int/2011/Kessler-ICIRA-2011.pdf>>, In Proceedings of the 4th International Conference on Intelligent Robotics and Applications, Dec. 6, 2011, pp. 1-10.

Takayama, et al., "Influences on Proxemic Behaviors in Human-Robot Interaction", Retrieved at <<http://www.leilatakayama.org/downloads/Takayama.HRIProxemics_IROS2009_prepress.pdf, in IEEE/RSJ International Conference on Intelligent Robots and Systems, IROS, Oct. 2009, pp. 1-8.

Hester, et al., "RTMBA: A Real-Time Model-Based Reinforcement Learning Architecture for Robot Control", Retrieved at <<http://www.cs.utexas.edu/~ai-lab/pubs/ICRA12-hester.pdf>>, In IEEE International Conference on Robotics and Automation, May 2012, pp. 1-6.

Quintia, et al., "Learning in Real Robots from Environment Interaction", Retrieved at <<http://www.jopha.net/index.php/jopha/article/viewFile/105/90>>, in Journal of Physical Agents, vol. 6, Issue 1, Jan. 2012, pp. 1-9.

Hester, et al., "Generalized Model Learning for Reinforcement Learning on a Humanoid Robot", Retrieved at <<http://www.cs.utexas.edu/~ai-lab/pubs/ICRA10-hester.pdf>>, in IEEE International Conference on Robotics and Automation, May 2010, pp. 1-6.

Strauss, et al., "Autonomous Navigation based on a Q-Learning Algorithm for a Robot in a Real Environment", // ritdml.rit.edu/bitstream/handle/1850/8953/CStrausProceedings06-2008.pdf?sequence=1, Jun. 2, 2008, pp. 1-5.

Mitsunaga, et al., "Robot Behavior Adaptation for Human-Robot Interaction based on Policy Gradient Reinforcement Learning", Retrieved at <<http://n.mtng.org/iros05.pdf>>, in IEEE/RSJ International Conference on Intelligent Robots and Systems, Aug. 2, 2005, pp. 1-8.

Sutton, et al., "Reinforcement Learning: An Introduction", Retrieved at <<http://ntebooks.googlecode.com/svn/trunk/%D0%9A%D0%B8%D0%B1%D0%B5%D1%80/bigbooks/Reinforcement%20Learning%20-%20Sutton,%20Barto.pdf>>, In MIT Press, Mar. 1, 1998, pp. 1-398.

Rasmussen, et al., "Gaussian Processes for Machine Learning", Retrieved at <<http://www.gaussianprocess.org/gpml/chapters/RW.pdf, In MIT Press, Jan. 2006, pp. 1-266.

"International Search Report & Written Opinion for PCT Application No. PCT/US2014/019178", dated Sep. 10, 2014, 15 Pages.

Nassour, et al., "Qualitative Adaptive Reward Learning With Success Failure Maps: Applied to Humanoid Robot Walking", In IEEE Transactions on Neural Networks and Learning Systems, vol. 24, Issue 1, Jan. 1, 2013, 14 Pages.

"International Preliminary Report on Patentability for PCT Application No. PCT/US2014/019178", dated Mar. 16, 2015, 8 Pages.

"Communication Under Rule 71(3) EPC for European Patent Application No. 14712825.0", dated Jul. 11, 2016, 39 Pages.

"Office Action for Chinese Patent Application No. 201480012191.1", dated Jan. 23, 2017, 15 Pages.

"Notice on Grant of Patent Right and Proceeding with the Registration Formalities for Chinese Patent Application umber 201480012191.1", dated Jul. 5, 2017, 7 pages.

"Office Action Response for Chinese Patent Application No. 201480012191.1", Filed Date: Jun. 7, 2017, 19 pages.

* cited by examiner

ADAPTING ROBOT BEHAVIOR BASED UPON HUMAN-ROBOT INTERACTION

BACKGROUND

A robot, as the term is used herein, is an electromechanical machine that includes computer hardware and software that causes the robot to perform functions independently and without assistance from a human. Exemplary robots that are now commercially available include robotic vacuum cleaners and lawnmowers. For example, a conventional commercially available robotic vacuum cleaner includes computer-executable instructions that, when executed by a processor of the robotic vacuum cleaner, cause the robotic vacuum cleaner to automatically vacuum a particular area (e.g., a room) based upon inputs received from sensors of the robotic vacuum cleaner. A conventional commercially available robotic lawnmower is configured with computer-executable instructions that, when executed by a processor of the robotic lawnmower, cause such robotic lawnmower to automatically, and without human intervention, cut grass in a particular region (e.g., a homeowner's backyard).

Over time, it can be expected that mobile robots that are configured to perform specified tasks will be relatively commonplace. Currently, commercially available robots, in both industrial and domestic environments, are hard-coded to perform certain actions responsive to receiving sensor input. For example, if a sensor on the robotic lawnmower detects an impediment, such as a human being, in its path, computer-executable code for the robotic lawnmower written by a developer causes the robotic lawnmower to stop and/or change direction. Conventional robotic devices, however, are ill-equipped for handling more complex scenarios.

SUMMARY

The following is a brief summary of subject matter that is described in greater detail herein. This summary is not intended to be limiting as to the scope of the claims.

Described herein are various technologies pertaining to automatically adapting behavior of a mobile robotic device (a robot) in an environment in which the mobile robotic device is operating based upon sensed conditions in the environment and whether a task, with respect to a human, has been successfully completed or has not been successfully completed. Thus, the behavior of the robot is adapted to increase a likelihood that the robot will complete the task successfully with respect to a human that subsequently enters the environment of the robot. In an exemplary embodiment, the robot can learn techniques that, over time, increase the likelihood that the task will be successfully completed by the robot given changing conditions in the environment.

With more particularity, it can be expected that the use of mobile robotic devices in different parts of society will be relatively commonplace in the near future. This change from controlled environments (e.g. factories) to unconstrained environments, where people are constantly present and moving about (e.g. homes, public places, hospitals, etc.), will increase the need for robots to behave in "socially acceptable" manners to cause humans to interact with such robots. This need for socially acceptable behavior can cross many domains (e.g., "can I make noise now?" "how fast can I move without causing a human to feel uncomfortable?" "can I cross in front of this person based upon a known position, direction of travel, and velocity of travel of the person?", etc.).

The technologies described herein relate to a learning framework that permits a robot to adapt its behavior according to previously observed human behavior in the environment of the robot. In an exemplary embodiment, the framework is based upon application of principles from reinforcement learning on top of a Gaussian Regression Process (GRP). This learning framework can assist the robot in adapting its behavior to increase a likelihood, for each robot-human interaction, that the robot will successfully complete a predefined task with respect to a respective human.

For instance, a task that is desirably completed by the robot with respect to humans can be causing humans to engage with the robot in an environment of the robot. An exemplary engagement may be a human accepting particular material from the robot (e.g., an advertisement). Another exemplary engagement may be a human setting forth certain voice input to the mobile robotic device. Yet another exemplary engagement may be a human setting forth some other desired input by way of a keyboard of the robot or a gesture, amongst others. The robot includes a plurality of sensors that are configured to output signals that are representative of respective conditions of the environment and/or conditions of the robot. Conditions of the robot may be under the control of the robot. For example, conditions of the robot can include a distance between the robot and a human, an angle at which the mobile robot is approaching the human, a volume of a speaker of the robot, a tone of acoustic signals output by the robot, a velocity and/or acceleration of the robot, etc. Conditions of the environment may be entirely outside of the control of the robot, and may include, for example, time of day, temperature, speed at which a human is walking, size of the human, gender of the human, ethnicity of the human, amongst others. Over time, through observing conditions (both under the control of the robot and outside of the control of the robot) and by ascertaining whether or not a predefined task was successfully completed, the robot (through the learning framework mentioned above) can adapt its behavior to improve the likelihood that the task will be completed successfully for a subsequent human in the environment (where different conditions are observed). For example, for the particular environment, the robot can learn an optimal distance to position itself relative to a human for a particular time of day and gender to maximize a probability that the task with respect to the human will be successfully completed.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to human-robot engagement are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Figure 1:
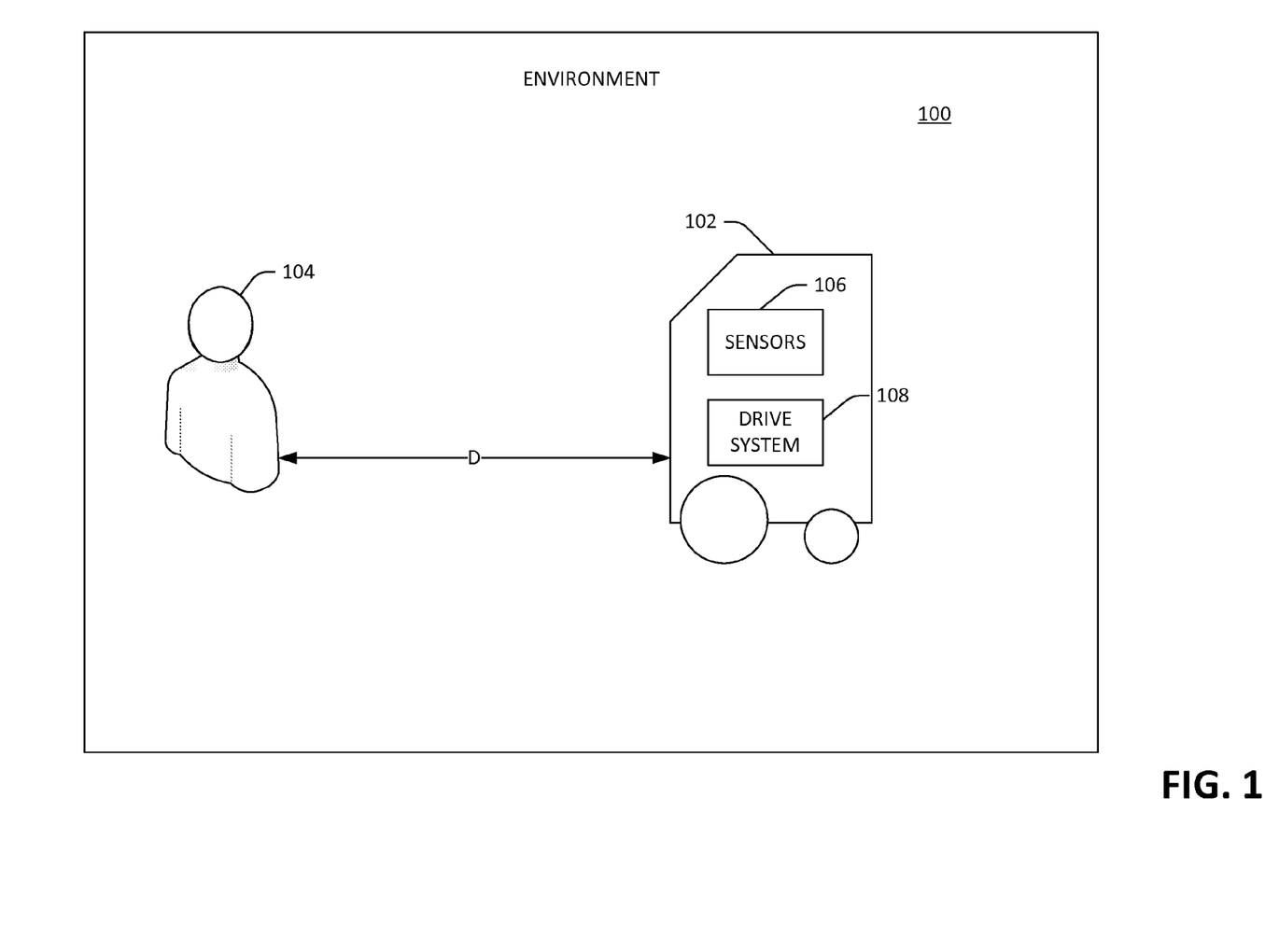
FIG. 1 illustrates an exemplary mobile robotic device interacting with a human in a particular environment.

With reference now to FIG. 1, an environment 100 in which a mobile robotic device 102 (robot) attempts to complete a predefined task with respect to a human 104 is illustrated. For example, the environment 100 may be an environment where the robot 102 and/or the human 104 is relatively unconstrained. This is in contrast to conventional environments where robots are used, where robots are constrained to particular regions, and their interaction with humans is likewise constrained. The exemplary environment 100 shown in FIG. 1, for instance, may be a public environment, such as, a mall, an airport, a stadium, an arena, a park, a library, or the like. The environment 100 may also be a relatively private environment, such as, a hospital, a place of business, etc.

The robot 102 includes a plurality of sensors 106 that are configured to output signals that are indicative of respective conditions pertaining to the environment 100 and/or the robot 102. The plurality of sensors 106 may include, for example, a clock, a temperature sensor, a depth sensor, a video camera, a microphone, a speedometer, an accelerometer, a gyroscope, a positional sensor, amongst others. Conditions pertaining to the environment 100 can include time of day, day of week, temperature, humidity, luminance, volume of acoustic signals, volume of speech from a particular human, positions of objects in the environment 100, size of the human 104, age of the human 104, gender or ethnicity of the human 104, direction of travel of the human 104, velocity of travel of the human 104, acceleration of travel of the human 104, facial expressions of the human 104, etc. Conditions pertaining to the robot 102 can include, but are not limited to including, a position of the robot 102 in the environment 100, position of the robot 102 relative to position of the human 104 in the environment 100, volume of audio output by a speaker of the robot 102, intensity of light emitted by the robot 102, etc.

In an exemplary embodiment, the plurality of sensors 106 can include a video camera, and conditions pertaining to the environment 100 and/or the robot 102 can be ascertained through analysis of a video signal output by the video camera. Other exemplary sensors that may be included in the sensors 106 comprise a depth sensor, a microphone, a light sensor, a speedometer, an accelerometer, a positional sensor, amongst others.

The robot 102 includes a drive system 108 that is in communication with a processor (not shown) that transmits a signal to such drive system 108 that causes the robot 102 to transition to a desired position in the environment 100. The drive system 108 includes a motor, associated gearing, and the like that can be employed to transition the robot 102 in the environment 100.

The robot 102, in the examples set forth herein, is programmed to operate to complete a predefined task with respect to humans in the environment 100. In an exemplary embodiment, such predefined task can be causing the human 104 to engage with the robot 102 in the environment 100. Examples of engagement between the robot 102 and the human 104 can include the human 104 accepting an item from the robot 102 (e.g., such as a product sample, an advertisement, or other flier), the human 104 setting forth desired input to the robot 102 (e.g., answering a questionnaire either verbally, through gestures, or through interaction with hardware of the robot 102), the human 104 following an instruction output by the robot 102, amongst others. Accordingly, the robot 102 is programmed to analyze signals output by a subset of sensors in the plurality of sensors 106 and to perform an action that, based upon observations regarding previous interactions of the robot 102 with other humans in the environment 100, is believed to increase a probability that the task (e.g. causing the human 104 to engage with the robot 102) will be successfully completed.

Therefore, for example, the behavior of the robot 102 can be adapted based upon observations made during previous robot-human interactions to increase a likelihood that the task will be successfully completed with respect to a human who subsequently enters the environment 100. For instance, based upon previous interactions with humans in the environment 100, the robot 102 can learn that humans are most likely to engage with the robot 102 in the morning if the robot 102 is at a certain distance D from the human 104 when attempting to initiate engagement with the human 104. In such case, the processor can output a signal that causes the motor of the drive system 108 to position the robot 102 at the distance D from the human 104.

Thereafter, at least one signal from at least one sensor in the plurality of sensors 106 can be analyzed to ascertain whether or not the task was completed successfully. For example, if the task was for the human 104 to accept a flier from the robot 102, and the human 104 accepted such flier (as indicated by a signal output by at least one sensor from the plurality of sensors 106), then the robot 102 can ascertain that the task was completed successfully. Conversely, if the signal output by the at least one sensor from the plurality of sensors 106 indicates that the human 104 did not accept the flier, then the robot 102 can ascertain that the task had failed to be successfully completed. The robot 102 may then adapt its behavior based upon 1) signals output by the subset of sensors from the plurality of sensors 106 pertaining to when the robot 102 attempted to complete the task with respect to the human 104; and 2) the determination as to whether or not the task completed successfully. Such adaption can be undertaken online, without pulling the robot 102 from the environment 100 and reprogramming the robot 102. Therefore, over time, the robot 102 will become more adept at successfully completing the task with respect to humans in the environment 100, as the behavior of the robot 102 is adapted based upon observed interactions with humans in the environment 100.

With more specificity about the operation of the robot 102, prior to the robot 102 being placed in the environment 100, a programmer can identify a number of conditions pertaining to the environment 100 that are believed to influence the probability that the robot 102 will successfully complete a predefined task with respect to the human 104. Such conditions can be modeled and can be included in a computer-readable model that is accessed by a processor of the robot 102 when determining an action to perform in connection with attempting to complete the predefined task with respect to the human 104. Conditions not believed to have an influence as to whether or not the robot will successfully complete task can be labeled as noise. Pursuant to a particular example, the task may be the distributing of a flier for a new store opening at a shopping mall, and the probability of successfully distributing the filer to a human can depend upon the following conditions: 1) time of day; 2) distance between the robot 102 and the human 104; and 3) an initial position of the robot 102 in the environment 100. The conditions under control of the robot 102 include the initial position and the distance between the robot 102 and the human 104 when initially attempting to engage the human 104.

Over time, the robot 102 learns how the influences of conditions under its control, on a desired outcome, vary by themselves and as a function of conditions that are observable but outside of the control over the robot 102, such as the time of day and velocity of the human 104 as the human 104 approaches a region proximate to the robot 102. Over time, the robot 102 tunes the conditions under its control to increase the probability that the task with respect to the human 104 will be successfully completed. It can be ascertained that results will vary with the scenario. As the robot 102 learns the relationship between conditions under its control, those not under its control, and monitors task successes and failures with respect to humans in the environment 100, the robot 102 can tune its operations such that it controls the conditions that can be controlled in a manner that increases the likelihood of success as the robot 102 interacts with more and more humans.

As will be described in greater detail below, the learning framework employed by the robot 102 can be based upon the application of principles from reinforcement learning on top of a Gaussian Regression Process (GRP). If conditions under the control of the robot 102 are observed to influence actions of humans, then the model, through the learning process, can cause the robot 102 to operate in a manner that increases the likelihood of successfully completing the task with respect to the human 104.

Figure 2:
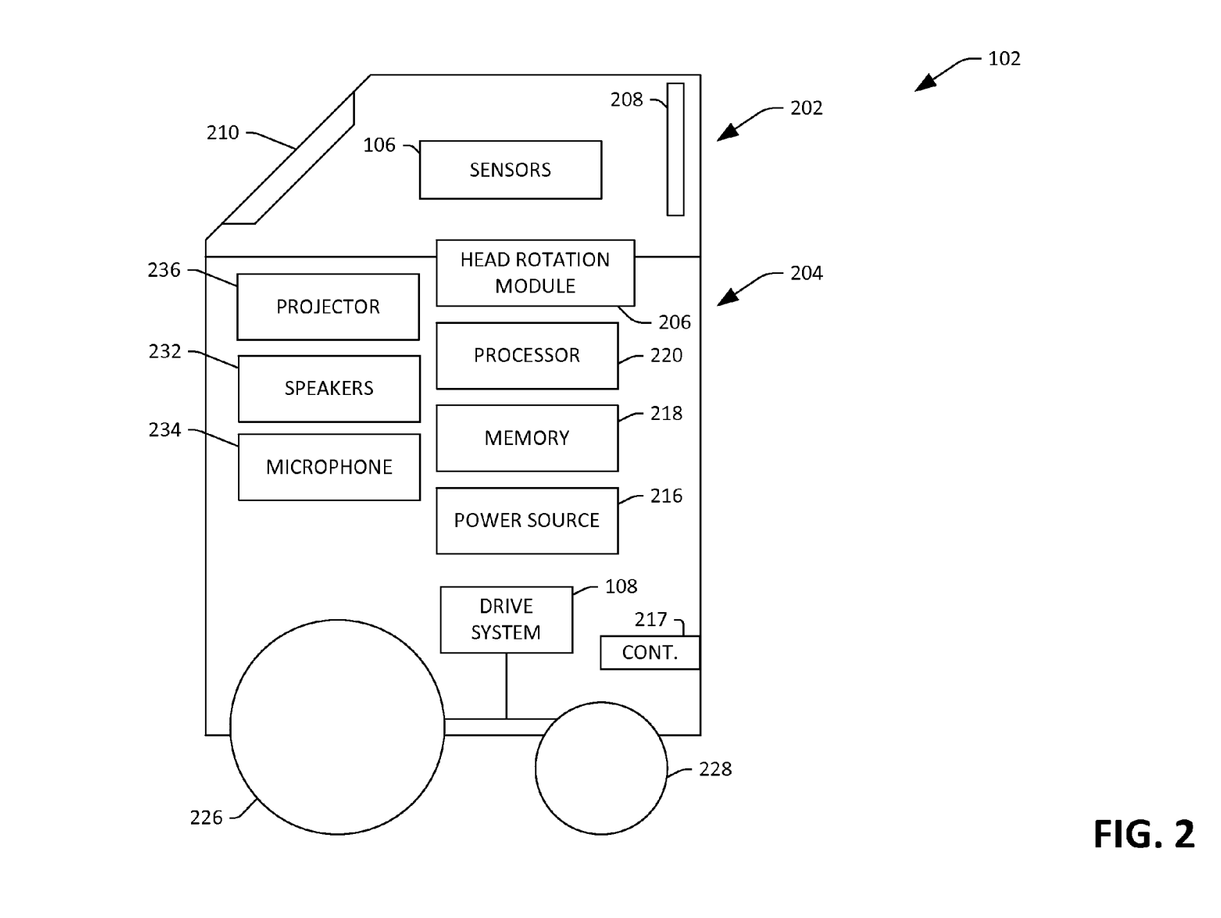
FIG. 2 illustrates an exemplary mobile robotic device.

Turning now to FIG. 2, a depiction of exemplary contents of the robot 102 is illustrated. The robot 102 may comprise a head portion 202 and a body portion 204, wherein the head portion 202 is movable with respect to the body portion 204. The robot 102 may comprise a head rotation module 206 that is operable to couple the head portion 202 with the body portion 204, wherein the head rotation module 206 can include one or more motors that can cause the head portion 202 to rotate with respect to the body portion 204. Pursuant to an example, the head rotation module 206 can be utilized to rotate the head portion 202 with respect to the body portion 204 up to 45° in any direction. In another example, the head rotation module 206 can allow the head portion 202 to rotate 90° in relation to the body portion 204. In still yet another example, the head rotation module 206 can facilitate rotation of the head portion 202 180° with respect to the body portion 204. In still yet another example, the head rotation module 206 can facilitate rotation of the head portion 202 360° in either direction with respect to the body portion 204.

The head portion 202 may comprise an antenna 208 that is configured to receive and transmit wireless signals. For instance, the antenna 208 can be configured to receive and transmit Wi-Fi signals, Bluetooth signals, infrared signals, sonar signals, radiofrequency signals, or other suitable signals. In yet another example, the antenna 208 can be configured to receive and transmit data to and from a cellular tower, the Internet, or the cloud (e.g., cloud computing). The robot 102 can send and receive communications to and from a remotely located computing device (e.g., another robot or control device, hand-held or otherwise) through utilization of the antenna 208.

The head portion 202 of the robot 102 can also comprise a display 210 that can be configured to display images or video to the human 104. In an example, the display 210 may be a touch-sensitive display, such that the human 104 can provide the robot 102 with information by way of selective interaction with the touch-sensitive display. Additionally, while not shown, the robot 102 may also comprise a keypad, such that a user of the robot 102 can interact with the robot 102 through utilization of the keypad.

The head portion 202 of the robot 102 may also comprise the plurality of sensors 106. For instance, the plurality of sensors can include a video camera that is configured to capture images of the surroundings (the environment 100) of the robot 102. In an example, the video camera can be a high-definition video camera that facilitates capturing still images or video that is in, for instance, 720p format, 720i format, 1080p format, 1080i format, or other suitable high definition video format. Additionally or alternatively, the video camera can be configured to capture relatively low resolution data in a format that is suitable for transmission through a remote computing device by way of the antenna 208.

As the video camera is shown as being included in the head portion 202 of the robot 102, through utilization of the head rotation model module 206, the video camera can be configured to capture live video data of a relatively large portion of the environment 100 of the robot 102. For instance, the video camera can be configured to perform a 360° scan of the environment 100 of the robot 102 as the head portion 202 rotates about the body portion 204 of the robot 102. Images captured by the video camera, as indicated above, can be analyzed to identify certain conditions pertaining to the environment 100 of the robot 102, such as size of the human 104, gender of the human 104, facial expressions of the human 104, etc.

As shown, the head portion 202 comprises the plurality of sensors 106, wherein such sensors 106 can include any suitable sensor type that can aid the robot 102 in performing one or more functions, such as autonomous navigation, engaging with the human 104, etc. In an example, the sensors 106 may comprise a depth sensor, which may include an infrared camera and/or an infrared beam projector. Such a depth sensor can be employed in connection with ascertaining a distance between the robot 102 and the human 104. The sensors 106 may also include a cliff sensor that is configured to detect a drop-off in elevation proximate to the robot 102, a positional sensor, such as a Global Positioning System (GPS) sensor, an accelerometer, a speedometer, a gyroscope, or the like. While shown as being included in the head portion 202, it is to be understood that the sensors 106 may be included in the body portion 204 or distributed between the head portion 202 and the body portion 204.

The body portion 204 of the robot 102 may include a power source 216 that is operable to provide power to modules in the robot 102. The power source 216 can be, for example, a battery, a super capacitor, a fuel cell, a chemical fuel cell, etc. In an exemplary embodiment, the power source 216 can be a rechargeable battery that can be charged by docking the robot 102 with a docking station. Thus, the robot 102 may comprise electrical contacts 217 that can mate with corresponding electrical contacts of a docking station to allow electric current to be delivered from the docking station to the power source 216.

The body portion 204 can also comprise a memory 218 and an associated processor 220. As will be described in greater detail below, the memory 218 can comprise a plurality of components that are executed by the processor 220, wherein execution of such components facilitates controlling one or more modules of the robot 102. The processor 220 can be in communication with other modules in the robot 102 by way of any suitable interface, such as, for instance, a motherboard. It is to be understood that the processor 220 is the "brains" of the robot 102, and is utilized to process data received from modules of the robot 102 (e.g., the one or more sensors 106 and/or other sensors) to cause the robot 102 to perform in a manner that facilitates completion of the predefined task with respect to the human 104.

The body portion 204 of the robot 102 may further comprise the drive system 108 that is operable to drive wheels 226 and 228 of the robot 102. For example, the wheel 226 may be a driving wheel, while the wheel 228 can be a steering wheel that can act to pivot, and thus change the orientation/direction of travel of the robot 102. Additionally, each of the wheels 226 and 228 can have a steering mechanism corresponding thereto, such that the wheels 226 and 228 can contribute to change in orientation of the robot 102. Furthermore, while the drive system 108 is shown as driving both of the wheels 226 and 228, it is to be understood that the drive system 108 may drive only one of the wheels 226 or 228, while another drive system can drive other of the wheels 226 or 228. Upon receipt of data from the sensors 106 and/or receipt of commands from a user (spoken commands, a gesture, etc.), the processor 220 can transmit signals to the head rotation module 206 and/or the drive system 108 to control orientation of the head portion 202 with respect to the body portion 204 of the robot 102 and/or orientation and position of the robot 102 in the environment 100.

The body portion 204 of the robot 102 may further comprise speakers 232 and a microphone 234. Data captured by way of the microphone 234 can be utilized in connection with responding to voice commands (speech utterances) from the human 104, accepting voice input from the human 104, determining volume of speech of the human 104, inferring a mood of the human 104, etc. The speakers 232 can be employed to output audio data to the human 104 in an attempt to initiate engagement between the human 104 and the robot 102 or to continue an engagement between the human 104 and the robot 102. The body portion 204 of the robot 102 may also comprise a projector 236 that can project images or video onto a projecting surface, such as a wall painted with a reflective coating.

While the robot 102 has been shown in a particular configuration and with particular modules included therein, it is to be understood that the robot 102 can be configured in a variety of different manners, and these configurations or contemplated by the inventors and are intended to fall under the scope of the hereto-appended claims. For instance, the head rotation module 206 can be configured with a tilt motor, such that the head portion 202 of the robot 102 can rotate and tilt (vertically) with respect to the body portion 204. Further, the robot 102 may not include two separate portions, but instead can be composed of a single unified body, wherein the body can be rotated to allow capture of video data by way of the video camera 212. In still yet another exemplary embodiment, the robot 102 can have a unified body structure, and the video camera described above can have a motor associated therewith (such as a servomotor), such that position of the video can be altered relative to the robot 102 to obtain different views of the environment 100. Still further, modules shown to be in the body portion 204 can be placed in the head portion 202 of the robot 102 and vice versa. It is to be understood that the robot 102 has been shown herein for purposes of explanation and is not intended to be limiting as to the scope of the hereto appended claims.

Figure 3:
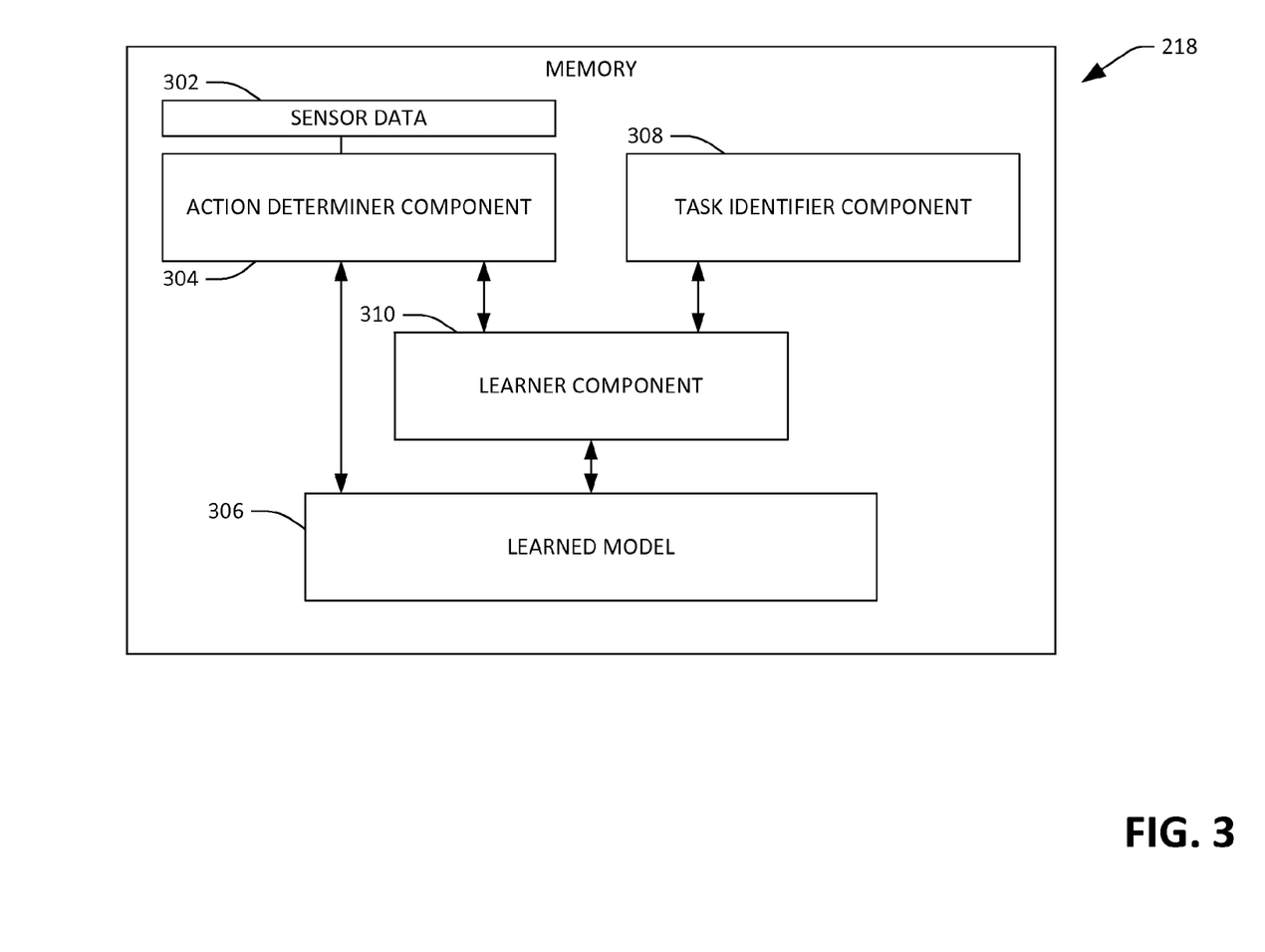
FIG. 3 illustrates exemplary computer-executable compounds that can be included in a computer-readable memory of a mobile robotic device.

With reference now to FIG. 3, an exemplary depiction of contents of the memory 218 of the robot 102 is illustrated. The memory 218 comprises sensor data 302 that is representative of signals received from a subset of the sensors 106. This sensor data 302, for instance, can be retained in a cache/buffer. Such sensor data 302, for purposes of explanation, may be sensor data pertaining to conditions that impact whether the robot 102 can successfully complete the task with respect to the human 104. In an exemplary embodiment, the sensor data 302 can include a first signal from a first sensor that indicates that a human is in the environment 100 of the robot 102, a second signal from a second sensor that is indicative of a condition of the environment 100 that is outside of the control of the robot 102, and a third signal from a third sensor that is indicative of a condition of the robot 102 that is controllable by the robot 102.

The memory 218 further comprises an action determiner component 304 that accesses a model 306 retained in the memory 218, wherein the model 306 is fit for a desired outcome (completion of the task with respect to the human 104) given previously observed sensor data. Initially, prior to the robot 102 being deployed in the environment 100, a manner in which humans interact with robots can be observed, and conditions that are relevant as to whether the robot 102 can complete the task with respect to a human can be identified. The action determiner component 304 receives the sensor data 302 and accesses the model 306, and based upon the sensor data 302 and the model 306, the action determiner component 304 determines an action to be undertaken by the robot 102 to complete the predefined task.

The memory 218 further includes a task identifier component 308 that receives at least a portion of the sensor data 302 and determines if the predefined task was successfully completed. For example, in some cases, whether the task has been successfully completed can be identified relatively easily based upon at least a portion of the sensor data 302. If the task is to provide the human 104 with a flier, the task identifier component 308 can determine if the task was successfully completed by identifying if the human 104 accepted the flier. In another example, the task identifier component 308 can determine whether the task has been successfully completed based upon audio feedback received from the human 104. In other situations, it may be more difficult to ascertain if the predefined task with respect to the user 104 was completed successfully. For instance, if the task is to have some sort of ongoing conversation with the human 104, it may be difficult to confidently determine when such conversation exists. Accordingly, the task identifier component 308 may use inference to ascertain if the task has been completed successfully, such that the task identifier component 308 infers about known states identified in at least a portion of the sensor data 302 to ascertain if the task has been completed successfully.

The memory 218 may further include a learner component 310 that can adapt the model 306 based at least in part upon: 1) the sensor data 302 relevant to a time when the robot 102 attempted to complete the task (e.g., ten seconds worth of sensor data beginning from when the robot 102 attempted to initiate engagement with the human 104), wherein the sensor data 302 indicates conditions of the environment 100 and/or the robot 102; 2) an action undertaken by the action determiner component 304; and 3) an indication from the task identifier component as to whether the robot 102 successfully completed the task. As will be described in greater detail below, the learner component 310 can employ a learning framework to adapt the model 306 while the robot 102 remains online, such that the likelihood that the robot 102 will successfully complete the task with respect to a next human in the environment 100 is increased.

A particular example is now set forth herein to illustrate actions undertaken by the action determiner component 304, the task identifier component 308, and the learner component 310. It is to be understood, however, that such example is not intended to be limiting as to the scope of the claims, particularly with respect to the predefined task and the conditions utilized in connection with adapting the model 306. It is therefore to be understood that the robot 102 may be configured to perform other tasks, where other conditions are relevant as to whether the robot 102 can successfully complete the task with respect to the human 104.

The exemplary scenario can be that of the robot 102 attempting to distribute a flier for a new store opening at a shopping mall. For this example, it can be assumed that the probability of success (providing the human 104 with the flier) is influenced by the following conditions: time of day; distance between the human 104 and the robot 102; and the initial position of the robot 102 in the environment 100. Thus, the model 306 can be fit based upon observations corresponding to such conditions. Other variables not considered in the model 306 can be lumped together in a noise component. In this example, the task identifier component 308 can identify immediately, after each approach to a human, if the task with respect to the human 104 was completed successfully, where success occurs only if an approached human accepts the flier. In general, however, the identification of success does not have to be immediate, and does not have to be binary. The learner component 310 adapts the model 306 based upon observations captured in the sensor data 302 and indications as to whether the robot successfully completed the task with respect to approached humans, such that the robot 102 learns how to approach humans in an increasingly effective manner.

In the example, the robot 102 can choose a certain position p in the environment 100 from a discrete set of allowed positions P. The robot 102 can choose the certain position using the time of day t. Generally, when a human is within the range of perception of the robot 102, the robot 102 decides a distance d at which it will approach (e.g., initiate a conversation with) the human. The result of each approach is either successful or unsuccessful, and it is assumed that no cost is associated with approaching a human. Thus, for purposes of this example, in the environment 100, the robot 102 can approach every human possible. Therefore, the problem of choosing the distance d at which to approach a human can be defined more formally as follows.

The result $r_i$ of each approach $\mathcal{T}_i \in \mathcal{T}$ is a binary random variable (success or failure), with the probability of success being a function of an input parameter vector x, which includes the position of the robot 102 $p_i \in P$, the approach distance $d_i \in D$, and the time of day $t_i \in T$. The subset of successful approaches (when the robot 102 successfully dispenses a flier) can be labeled as $\mathcal{T}_s = \{\mathcal{T}_i \in \mathcal{T} | r_i = \text{success}\}$. The learner component 310 is tasked with optimizing the success rate of approaches to humans over variables under the control of the robot 102. This can be stated as follows:

$$\underset{P,D}{\text{maximize}} \frac{|\mathcal{T}_S|}{|\mathcal{T}|},$$

where |•| represents the cardinality of a set.

The problem set forth above can be addressed by the learner component 310 as a regression problem on top of which a GPR technique is applied. Such technique assumes that data can be represented as a sample from a multivariate Gaussian distribution. The learner component 310 can combine GPR with an exploration policy based on principles from reinforcement learning.

With more specificity, given the vector of input variables x, a Gaussian process is completely specified by its mean function (m(x)) and covariance function (k(x,x')). Accordingly, the random process f(x) can be approximated as a Gaussian process:

$$f(x) \sim \mathcal{G}P(m(x), k(x, x')). \tag{1}$$

The covariance function can be modeled as a combination of the covariance function of each one of the state parameters, time of day ($k_t$) and approach distance ($k_d$) as follows:

$$k(x, x') = \alpha_1 k_t(x, x') + \alpha_2 k_d(x, x') \tag{2}$$

It can be noted that this does not imply that the variables are linearly related, but rather that the covariance (α) of one does not change as a function of the other. The position variable can be treated separately, and therefore such variable is not incorporated in the covariance matrix.

The adapting of the model by the learner component 310 involves two steps. Initially, the learner component 310 can fit a covariance matrix related to the process that best explains the data in the sensor data 302. This can be performed by maximizing the likelihood of the sensor data 302 as a function of the parameters in the covariance function. More specifically, each of the covariance matrices $K_t$ and $K_d$ corresponding to the specific vectors $x_i$ for previously attempted approaches $$K(x, x) = \begin{bmatrix} k(x_1, x_1) & \cdots & k(x_1, x_n) \\ \vdots & \ddots & \vdots \\ k(x_n, x_1) & \cdots & k(x_n, x_n) \end{bmatrix} \qquad (3)$$

is obtained by modeling $k(x,x)$ as follows:

$$k(x_i, x_j) = \sigma_f^2 \exp\left(\frac{-(x_i - x_j)^2}{2l^2}\right) + \sigma_n^2 \delta_{ij}(x_i, x_j) \qquad (4)$$

where $\delta_{ij}(x_i, x_j)$ is a Kronecker delta which is one if and only if i=j, and zero otherwise. The squared exponential function has some characteristic parameters, such as the maximum allowable covariance $\sigma_f^2$, a length parameter related to the separation of the observations (l), and a parameter related to the process noise ($\sigma_n^2$).

The learner component 310 can then predict the mean and variance of the process according to the observations vector y as follows:

$$\bar{y}_* = K_* K^{-1} y \qquad (5)$$

$$\text{var}(y_*) = K_{**} - K_* K^{-1} K_*^T, \qquad (6)$$

where $y_*$ is the Gaussian process prediction (random variable) for an observed input vector $x_*$, $\bar{y}_*$ is its mean, and $\text{var}(y_*)$ its variance. The covariance matrices are $K=K(x,x)$, $K_*=K(x_*,x)$, and $K_{**}=K(x_*,x_*)$ Since the learner component 310 executes such method iteratively, an efficient policy is desirable to choose the next state to visit in order to improve the model 306. Considering the mean (Eq. 5) and variance (Eq. 6) previously presented, a policy regarding position in the environment 100 where the robot 102 positions itself is set forth below (Eq. 9). Among all the possible positions in the environment 100, the action determiner component 304 can choose the position with the maximum predicted mean with a probability $P_{mean}^p$, the position with highest predicted value on a 95% C.I. with a probability $P_{ci}^p$, or a random position otherwise.

$$p_{mean} = \text{argmax}_{\forall i \in |P|} \max(\bar{y}_*)^{[i]} \qquad (7)$$

$$p_{std} = \text{argmax}_{\forall i \in |P|} \max(\bar{y}_* + 1.96\sqrt{\text{var}(y_*)})^{[i]} \qquad (8)$$

$$p \sim \begin{cases} p_{mean}, & \text{if } r \leq P_{mean}^p \\ p_{std}, & \text{if } P_{mean}^p < r \leq P_{ci}^p \\ \mathcal{U}(1, |P|), & \text{otherwise} \end{cases} \qquad (9)$$

where $r \in [0,1]$ is a random real number with uniform distribution.

Presented below in Eq. (12), a policy that can be employed by the action determiner component 304 when selecting a distance between the robot 102 and the human 104 is set forth. Assuming a position was chosen, data from the sensor data 302 can be retrieved, and possible distance values can be predicted. Similar to selection of a position, with a probability $P_{mean}^d$, the distance value with the maximum mean can be selected, but a distance with a Normal distribution can be selected by the action determiner component 304, considering such the above-mentioned distance value. The distance value with the highest value on a 95% C.I. with a probability $P_{ci}^d$ is selected, and distance can be chosen again with a Normal distribution. Otherwise, a value is uniformly randomly chosen in the domain of the set of distances. This process can assist the robot 102 in exploring possibilities, in that the robot 102 may not choose a distance identified as being an optimal distance, but instead can select a distance to better learn probabilities corresponding to possible distances (and thus, over time, learn an optimal distance). The robot 102 can, however, select a distance from the domain of distances that is amongst a threshold number of distances that have a highest probability with respect to the human engaging with the robot 102.

$$d_{mean} = \text{argmax}_{\forall x \in x_*} \max(\bar{y}_*) \qquad (10)$$

$$d_{std} = \text{argmax}_{\forall x \in x_*} \max(\bar{y}_* + 1.96\sqrt{\text{var}(y_*)}) \qquad (11)$$

$$r \sim \begin{cases} \mathcal{N}(d_{mean}, \sigma_d^2), & \text{if } r \leq P_{mean}^d \\ \mathcal{N}(d_{std}, \sigma_d^2), & \text{if } P_{mean}^d < r \leq P_{ci}^d \\ \mathcal{U}(\min(D), \max(D)), & \text{otherwise} \end{cases} \qquad (12)$$

where $r \in [0,1]$ is a random real number with uniform distribution.

In summary, the action determiner component 304 can monitor the sensor data 302 to identify when the human 104 is in proximity to the robot 102. When the action determiner component 304 detects that the human 104 is in proximity to the robot 102, the action determiner component 304 can access the model 306 using data captured by sensors, wherein such data is known to be relevant to the ability of the robot 102 to successfully complete the task with respect to the human 104. Through accessing the model 306, the action determiner component 304 can determine an action to undertake that takes into consideration the learning of probabilities corresponding to possible actions without greatly sacrificing the probability of successfully completing the task.

Thus, the action determiner component 304 can receive at least one signal from at least one sensor that is indicative of a condition that can be controlled by the robot 102, and may optionally include at least one signal from at least one sensor that is indicative of a condition that is outside of the control of the robot 102. When accessing the model 306, the action determiner component 304 can determine how to modify the condition that is under the control of the robot 102 to increase the likelihood that the task with respect to the user 104 will be completed successfully (given observed previous interactions with other humans).

The task identifier component 304, as noted above, analyzes the sensor data 302 to identify if the task was completed successfully. The learner component 310 can receive sensor data pertaining to when/how the robot 102 approached the human 104 when attempting to complete the task, as well as the indication from the task identifier component 308 as to whether the task was or was not successfully completed. Using this information, the learner component 310 can adapt the model 306 (using regression), such that the likelihood of the robot 102 completing the tasks successfully with respect to a subsequent human in the environment is increased.

Figure 4:
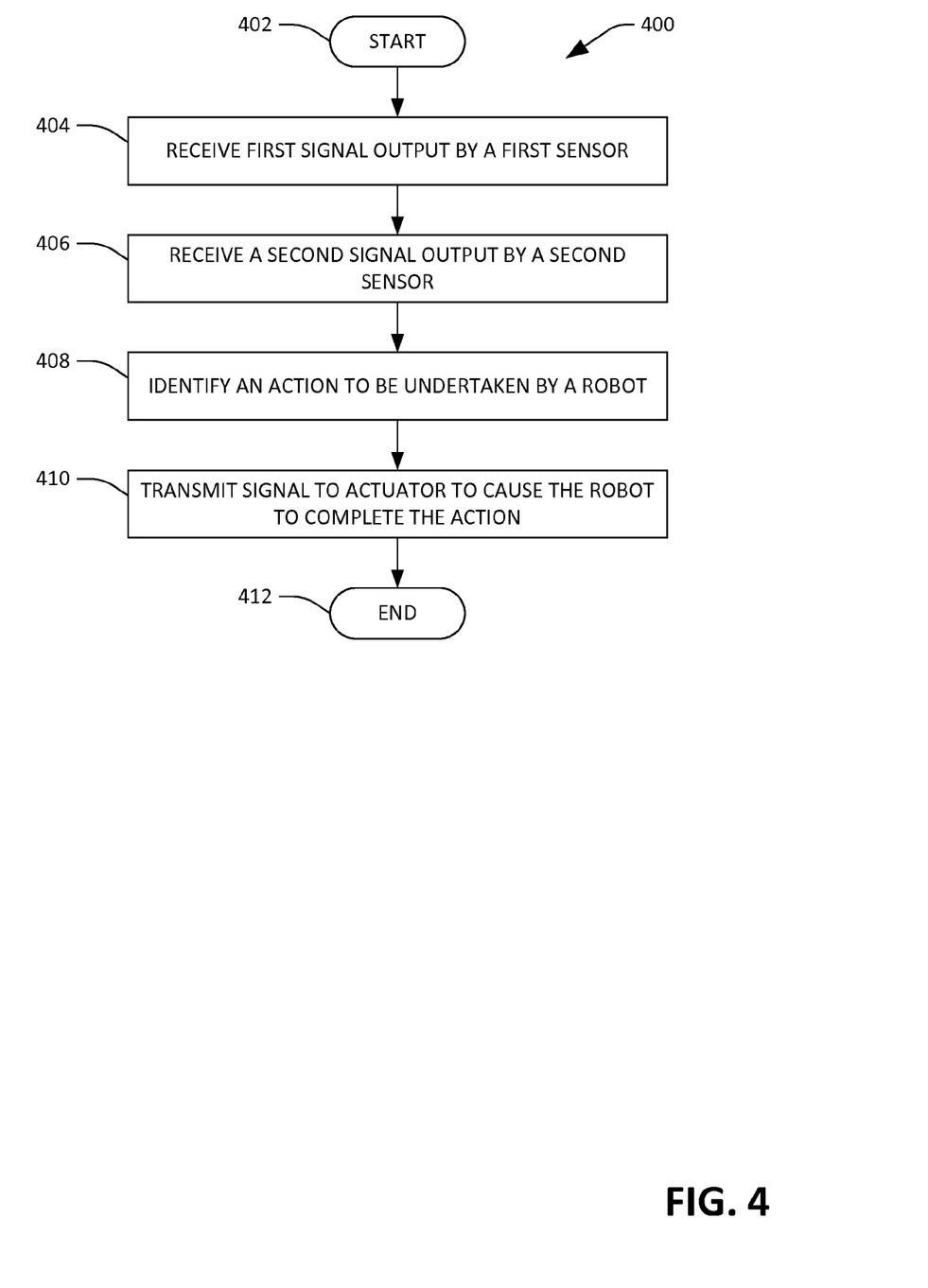
FIG. 4 is a flow diagram that illustrates an exemplary methodology for causing a mobile robotic device to perform an action that is learned to increase a likelihood that the mobile robotic device will successfully complete a task with respect to a human.
Figure 5:
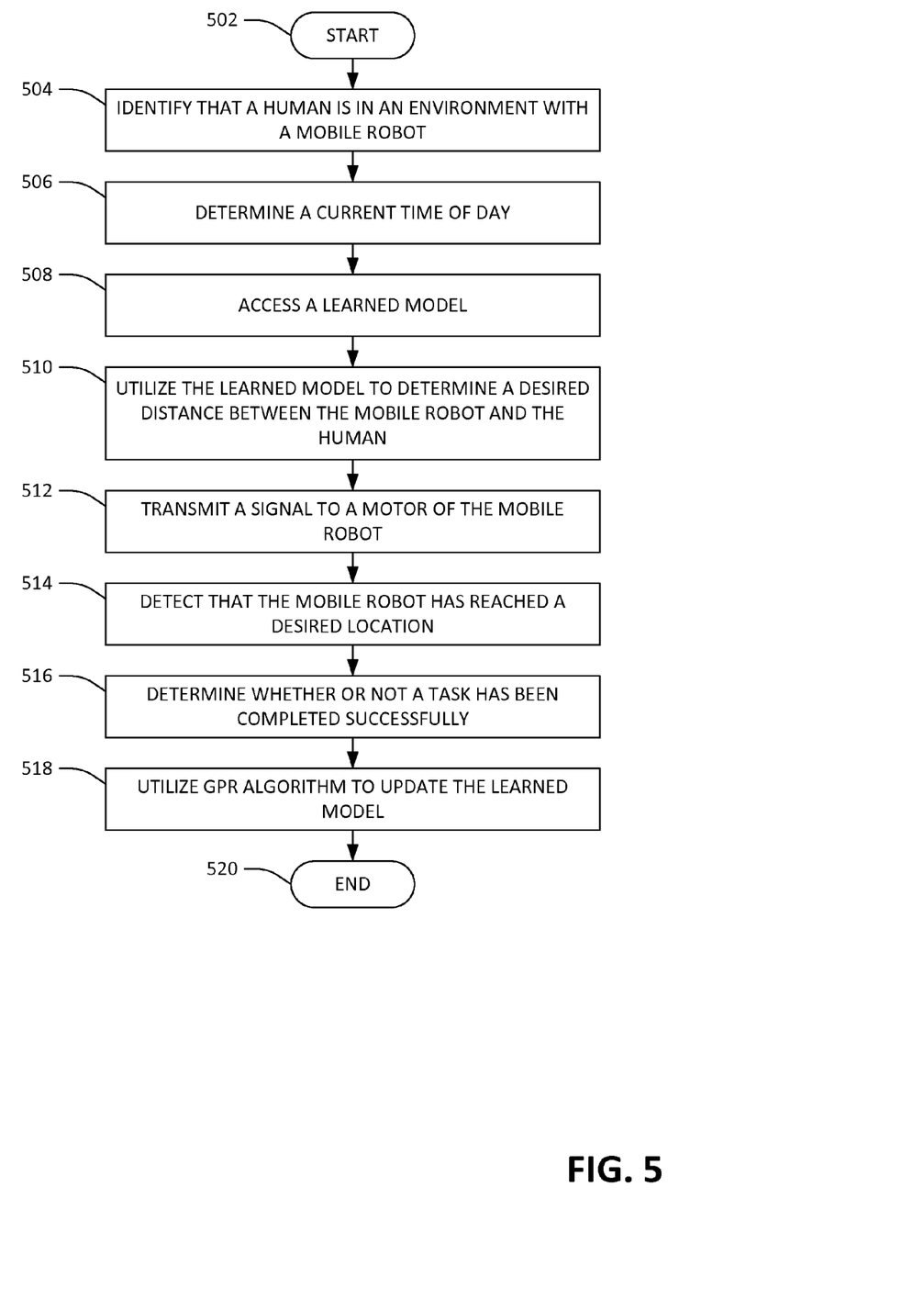
FIG. 5 is a flow diagram that illustrates an exemplary methodology for updating a learned model utilized by a mobile robotic device when attempting to cause a human to engage with the mobile computing device.

FIGS. 4-5 illustrate exemplary methodologies relating to human-robot engagement. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring solely to FIG. 4, an exemplary methodology 400 that facilitates determining an action to undertake with respect to a human in a particular environment that maximizes a probability that a task with respect to the human will be completed successfully is illustrated. The methodology 400 starts at 402, and at 404 a first signal output by a first sensor of the robot is received, wherein the first signal indicates that a human is in an environment of the robot. For instance, the first signal can be a video signal, wherein frames of the video signal capture a human in the environment of the robot.

At 406, a second signal output by a second sensor is received, wherein the second signal is indicative of a first condition pertaining to the environment, wherein the first condition is subject to control by the robot and has been identified as being relevant to the task that has been assigned to the robot. In the example set forth above, such signal may be a position of the robot, velocity of the robot, acceleration of the robot, volume of speakers of the robot, etc.

At 408, an action to be undertaken by the robot is identified, wherein the action is identified to complete the task that involves interacting with the human, and wherein the action is identified based at least in part upon the first signal output by the first sensor, the second signal output by the second sensor, and past successes and failures of the robot when the robot attempted to complete the task with respect other humans in the environment. As indicated above, the learning of the robot can be undertaken online.

At 410, the signal is transmitted to an actuator of the robot to cause the robot to perform the action identified at 408. Such action may be outputting speech at a particular volume, transitioning towards the human at a particular velocity, etc. The methodology 400 completed 412.

With reference now to FIG. 5, an exemplary methodology 500 for updating a model utilized by a robot to determine an action to undertake with respect to a human to complete a particular task is illustrated. The methodology 500 starts at 502, and at 504, the mobile robot identifies that a human is in an environment therewith. At 506, a current time of day is determined. At 508, a model that is fit to observed data about the robot when the robot previously attempted to interact with humans in the environment is accessed.

At 510, the learned model is utilized to determine a distance between the mobile robot and the human that, in accordance with the learned model, assists the robot in learning optimal distances between the human and the robot given varying observations and additionally increases a likelihood that the robot will successfully engage the human. For example, GPR can be employed to determine the distance between the mobile robot and the human. At 512, a signal is transmitted to a motor of the mobile robot, the signal causing the motor to drive the mobile robot from a first location in the environment to a second location in the environment. When the mobile robot is at the second location, a distance between the mobile robot and human is the distance determined at 510.

At 514, it is detected that the mobile robot has reached the desired location (the second location). At 516, responsive to detecting that the robot is at the second location, a determination is made as to whether the human engaged with the mobile robot or failed to engage with the mobile robot. At 518, immediately responsive to the identifying whether the human engaged with the mobile robot or failed to engage with the mobile robot, principles from reinforcement learning are used to update the model based at least in part upon the current time of day, the distance determined at 510, and the identifying whether the human engaged with the robot or failed to engage with the robot. The model is thus updated to increase a probability that a human, subsequently identified as being in the environment, will engage with the robot. The methodology 500 completes 520.

Figure 6:
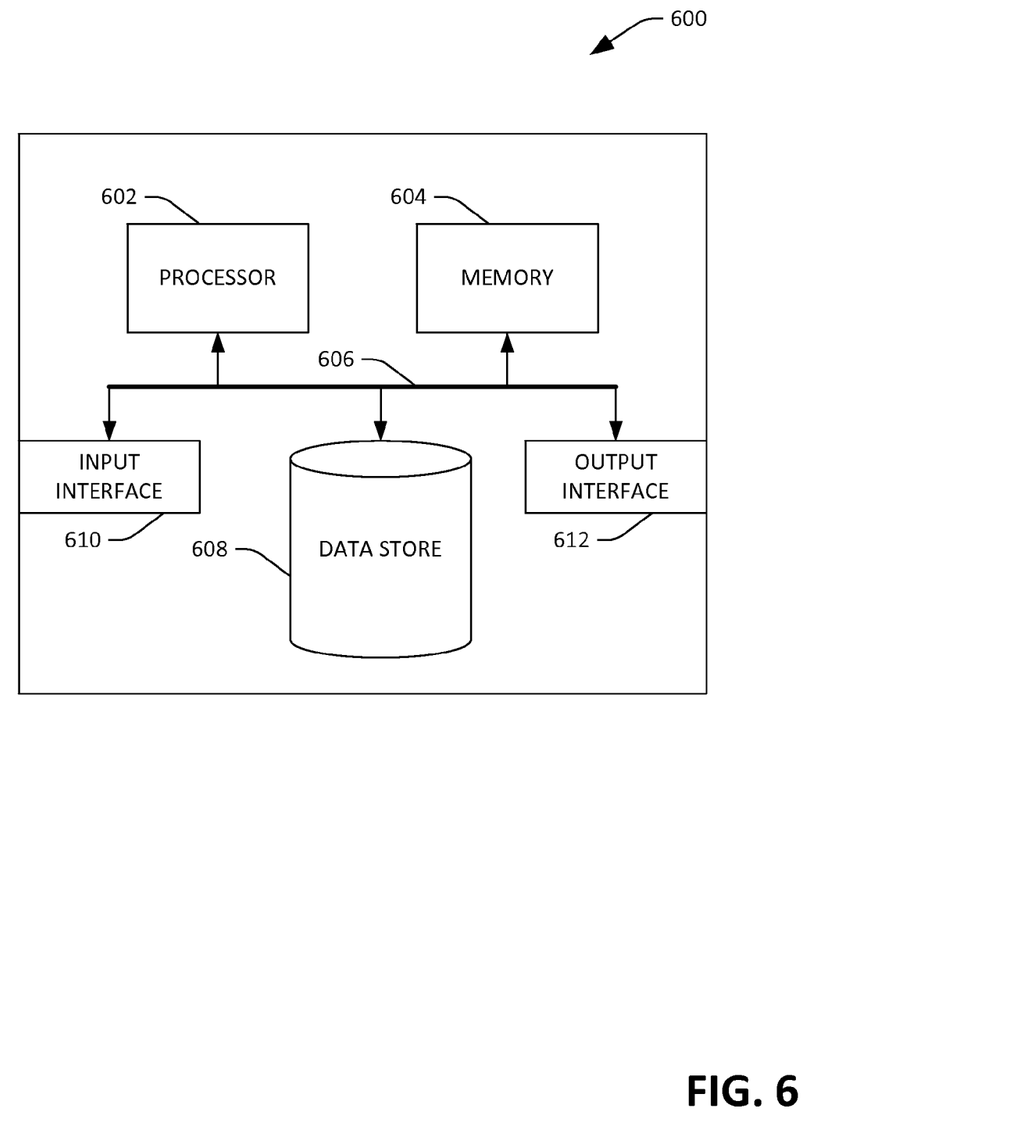
FIG. 6 is an exemplary computing system.

Referring now to FIG. 6, a high-level illustration of an exemplary computing device 600 that can be used in accordance with the systems and methodologies disclosed herein is illustrated. For instance, the computing device 600 may be used in a system that facilitates updating a learned model corresponding to successful completion of a task by a robot. By way of another example, the computing device 600 can be used in a system that supports determining an action to perform to assist a robot in successfully completing a task. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store sensor data, a model fit to observed data, etc.

The computing device 600 additionally includes a data store 608 that is accessible by the processor 602 by way of the system bus 606. The data store 608 may include executable instructions, sensor data, a map of an environment, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

It is contemplated that the external devices that communicate with the computing device 600 via the input interface 610 and the output interface 612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 600 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 600 may be a distributed system. Thus, for instance, several devices may be in communication by way of a network connection and may collectively perform tasks described as being performed by the computing device 2000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method executed by a processor in a mobile robotic device, the method comprising:
   receiving a first signal output by a first sensor, the first signal indicating that a human is in an environment of the mobile robotic device, wherein the mobile robotic device is tasked with causing the human to engage with the mobile robotic device;
   receiving a second signal output by a second sensor, the second signal being indicative of a first condition pertaining to the mobile robotic device, the first condition being subject to control by the mobile robotic device, and the first condition identified as being relevant to causing the human to engage with the mobile robotic device;
   identifying an action to be undertaken by the mobile robotic device, the action identified to facilitate causing the human to engage with the mobile robotic device, the action identified based upon the first signal output by the first sensor, the second signal output by the second sensor, and past successes and failures of the mobile robotic device when attempting to cause other humans to engage with the mobile robotic device in the environment, wherein the action is further identified based upon the mobile robotic device tuning its operation over time with respect to the first condition to optimize a probability that the mobile robotic device will cause the human to engage with the mobile robotic device; and
   transmitting a signal to an actuator of the mobile robotic device to cause the mobile robotic device to perform the action.

2. The method of claim 1, further comprising:
   ascertaining whether the mobile robotic device successfully caused the human to engage with the mobile robotic device or failed to cause the human to engage with the mobile robotic device; and
   responsive to the ascertaining of whether the mobile robotic device successfully caused the human to engage with the mobile robotic device or failed to cause the human to engage with the mobile robotic device, updating a model that is employed in connection with identifying the action to be undertaken by the mobile robotic device, the model updated to increase a likelihood that the mobile robotic device will successfully cause another human to engage with the mobile robotic device when attempting to interact with the another human that subsequently enters the environment.

3. The method of claim 2, wherein the ascertaining of whether the mobile robotic device successfully caused the human to engage with the mobile robotic device or failed to cause the human to engage with the mobile robotic device comprises:
   identifying a spoken utterance set forth by the human to the mobile robotic device; and
   ascertaining whether the mobile robotic device successfully caused the human to engage with the mobile robotic device or failed to cause the human to engage with the mobile robotic device based upon the identifying of the spoken utterance set forth by the human to the mobile robotic device.

4. The method of claim 2, wherein the ascertaining of whether the mobile robotic device successfully caused the human to engage with the mobile robotic device or failed to cause the human to engage with the mobile robotic device comprises:

identifying a gesture set forth by the human to the mobile robotic device; and ascertaining whether the mobile robotic device successfully caused the human to engage with the mobile robotic device or failed to cause the human to engage with the mobile robotic device based upon the identifying of the gesture set forth by the human to the mobile robotic device.

5. The method of claim 2, wherein the updating of the model comprises utilizing at least one computer-executable reinforcement learning algorithm to update the model.

6. The method of claim 5, wherein identifying of the action comprises executing a Gaussian Process Regression algorithm over the model.

7. The method of claim 1, the first sensor being a video camera, the first signal being a video signal output by the video camera, the second sensor being a depth sensor, and the second signal being indicative of a distance between the mobile robotic device and the human.

8. The method of claim 7, wherein the action to be undertaken by the mobile robotic device is a transition from a current position in the environment to a different position relative to the human to alter the distance between the mobile robotic device and the human, wherein the action is identified to increase a likelihood that the human will engage with mobile robotic device relative to a probability that the human will engage with the mobile robotic device if the mobile robotic device remains at the current position.

9. The method of claim 1, further comprising receiving a third signal output by a third sensor, the third signal being indicative of a second condition pertaining to the environment, the second condition being uncontrollable by the mobile robotic device, wherein identifying the action to be undertaken by the mobile robotic device is based upon the third signal output by the third sensor.

10. The method of claim 9, wherein the second condition is time of day.

11. A mobile robot, comprising:
a motor that, when actuated, causes the robot to transition in an environment;
a first sensor that outputs a first signal that is indicative of a first condition corresponding to the robot, the first condition being controllable by the robot;
a second sensor that outputs a second signal that is indicative of a second condition corresponding to the environment, the second condition being uncontrollable by the robot;
a third sensor that outputs a third signal that is indicative of existence of a human in the environment;
at least one processor that receives the first signal, the second signal, and the third signal, the processor being in communication with the motor; and
memory that stores instructions that, when executed by the at least one processor, cause the at least one processor to perform acts comprising:
responsive to the processor receiving the third signal, accessing a learned model for causing the human to engage with the mobile robot;
based upon the learned model, the first signal, and the second signal, determining an action to be undertaken by the robot to cause the human to engage with the mobile robot, the action determined to, in accordance with the learned model, optimize a first probability that the human will engage with the mobile robot; and transmitting a command to the motor in connection with causing the mobile robot to perform the action; and updating the learned model based upon the first signal, the second signal, and an indication as to whether the robot successfully caused the human to engage with the mobile robot or failed to cause the human to engage with the mobile robot, wherein the learned model is updated to tune operation of the mobile robot in order to maximize a second probability that mobile robot will cause another human to engage with the mobile robot when the processor detects that the another human has subsequently entered the environment.

12. The mobile robot of claim 11, further comprising a microphone that receives audible feedback from the human, and the acts further comprising identifying whether the mobile robot has successfully caused the human to engage with the mobile robot or failed to cause the human to engage with the mobile robot based upon the audible feedback received by the microphone from the human.

13. The mobile robot of claim 11, further comprising a video camera that captures a video signal that includes the human, the acts further comprising identifying whether the mobile robot has successfully caused the human to engage with the mobile robot or failed to cause the human to engage with the mobile robot based upon the video signal captured by the video camera.

14. The mobile robot of claim 11, determining the action to be undertaken by the robot to cause the human to engage with the mobile robot comprises determining a desired distance between the robot and the human.

15. The mobile robot of claim 14, wherein the action is transitioning the mobile robot from a first position to a second position in the environment, wherein when the mobile robot is at the second position a distance between the mobile robot and the human is the desired distance.

16. The mobile robot of claim 11, the first sensor being a depth sensor, the first condition being a distance between the robot and the human.

17. The mobile robot of claim 11, wherein determining the action comprises determining the action through utilization of a Gaussian Regression Process algorithm over the learned model.

18. A mobile robot comprising a computer-readable storage medium that comprises instructions that, when executed by a processor, cause the processor to perform acts comprising:
identifying that a human is in an environment with the mobile robot;
accessing a learned model responsive to identifying that the human is in the environment with the mobile robot;
utilizing the learned model, determining a distance between the mobile robot and the human that, in accordance with the learned model, is amongst a threshold number of distances that have a highest probability of the human engaging with the mobile robot, the threshold number of distances being from amongst a plurality of considered distances;
transmitting a signal to a motor of the mobile robot, the signal causing the motor to drive the mobile robot from a first location in the environment to a second location in the environment, wherein when the mobile robot is at the second location a distance between the mobile robot and the human is the distance that, in accordance with the learned model, maximizes the probability that the human will engage with the mobile robot;

detecting that the mobile robot is at the second location;

responsive to detecting that the mobile robot is at the second location, identifying whether the human engaged with the mobile robot or failed to engage with the mobile robot; and immediately responsive to identifying whether the human engaged with the mobile robot or failed to engage with the mobile robot, updating the model based at least in part upon the distance and whether the human engaged with the mobile robot or failed to engage with the mobile robot, wherein the model is updated to tune operation of the mobile robot such to maximize a probability that another human subsequently identified as being in the environment will engage with the mobile robot.

19. The mobile robot of claim 18, wherein the distance between the mobile robot and the human is determined based upon distances between the mobile robot and other humans when the mobile robot previously attempted to engage with the other humans in the environment.

20. The mobile robot of claim 18, wherein identifying whether the human engaged with the mobile robot or failed to engage with the mobile robot comprises identifying whether the human accepted material from the mobile robot.

* * * * *